US008644330B2

(12) United States Patent
Lomnitz et al.

(10) Patent No.: US 8,644,330 B2
(45) Date of Patent: Feb. 4, 2014

(54) ARCHITECTURE AND METHOD OF CHANNEL ESTIMATION FOR WIRELESS COMMUNICATION SYSTEM

(75) Inventors: Yuval Lomnitz, Herzelia M (IL); Tom Harel, Shfaim M (IL); Ayelet Doron, Modi'in (IL)

(73) Assignee: Intel Corporation, Santa Clara, CA (US)

( * ) Notice: Subject to any disclaimer, the term of this patent is extended or adjusted under 35 U.S.C. 154(b) by 255 days.

(21) Appl. No.: 13/074,935

(22) Filed: Mar. 29, 2011

(65) Prior Publication Data

US 2012/0250808 A1    Oct. 4, 2012

(51) Int. Cl.
*H04L 12/28*    (2006.01)

(52) U.S. Cl.
USPC .......................................... 370/431

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/395.53, 412–421, 431–457, 458–463, 370/464–497, 498–522, 523–520, 521–529
See application file for complete search history.

(56) References Cited

U.S. PATENT DOCUMENTS

| 8,300,651 | B1* | 10/2012 | Pick et al. ..................... 370/431 |
| 2007/0159959 | A1* | 7/2007 | Song et al. ..................... 370/208 |
| 2007/0211827 | A1* | 9/2007 | Baggen et al. ................. 375/316 |
| 2009/0060060 | A1* | 3/2009 | Stadelmeier et al. ......... 375/257 |
| 2010/0067596 | A1* | 3/2010 | Park et al. ..................... 375/262 |

OTHER PUBLICATIONS

Akino, T.K., "Optimum-Weighted RLS Channel Estimation for Rapid Fading MIMO Channels", IEEE, Transactions on Wireless Communications, vol. 7, No. 11, Nov. 2008, pp. 4248-4260.
International Search Report and Written Opinion received for PCT Patent Application No. PCT?US2012/029585, mailed Oct. 16, 212, 9 pages.
Manchon et al., "Channel Estimation Based on Divergence Minimization for OFDM Systems with Co-Channel Interference", IEEE ICC 09, pp. 1-6, 2009.

* cited by examiner

*Primary Examiner* — Jung-Jen Liu
(74) *Attorney, Agent, or Firm* — Kacvinsky Daisak PLLC (57) ABSTRACT

An apparatus may comprise a channel estimation architecture for wireless communications. Other embodiments are described and claimed.

18 Claims, 6 Drawing Sheets

ARCHITECTURE AND METHOD OF CHANNEL ESTIMATION FOR WIRELESS COMMUNICATION SYSTEM

BACKGROUND

In frequency division wireless communications, such as orthogonal frequency division multiplexing (OFDM), channel estimation is performed to estimate signal amplitude and phase shift caused by a given wireless channel. For pilot-based channel estimation, pilots and data tones may be distributed throughout a time-frequency resource block array, which is generally referred to as a physical resource unit (PRU) in the 802.16m standard and a resource block in the LTE standard. In order to perform channel estimation, calculations must be performed regularly, such as at the level of one PRU. Even at this level, a large number of calculations are involved to perform channel estimation. In the 802.16m standard, each communications sub-frame may transmit a preset number of symbols. In one example, the number of available frequency sub-carriers in a sub-frame may be 1728 and each PRU may contain 6 symbols times 18 sub-carriers such that one sub-frame corresponds to 96 PRUs.

Known channel estimation techniques using pilots distributed over a number of channels include linear minimum mean squared error (LMMSE) techniques. Due to calculational complexity, current channel estimation techniques typically apply simple one dimensional (1-D) LMMSE operations. However, in principle, two dimensional (2D) channel estimation, e.g., an LMMSE operation that treats at the same time all pilots and produces all channel estimates, is desirable due to its superior performance over single dimensional LMMSE, in which pilots are combined first along a frequency or time axis, and subsequently along the other axis. A drawback of using the 2D LMMSE is the matrix size: for a straightforward 2D LMMSE approach using a typical resource block size, the size of each matrix of coefficients relating the pilot values to the estimated channel on each subcarrier may range between 6×108 and 21×126, which corresponds to the number of pilots times the number of subcarriers in a PRU. Additionally, there are about 100 different matrices suitable for different transmission patterns when counting combinations of MIMO modes, interlacing versions, subframe durations, etc. Therefore, the total storage size for even a simple implementation of 2D LMMSE is about 120,000 coefficients per signal-to-noise ratio (SNR) point. In addition, in order to obtain improved channel estimation using 2D LMMSE by treating pilots of past sub-frames when possible, the number of pilots involved in the computation must be increased along with the complexity of calculation.

Furthermore, the optimal channel LMMSE estimation matrix is a function of the SNR and the channel model, which is typically composed of a power delay profile which describes the delay-spread, and Doppler spectrum which describes the time variability. Storing different matrices for each combination of SNR, channel conditions and pilot structure may be impractical, and therefore online calculation of these matrices is desirable. However, in a straight-forward implementation the calculation of the LMMSE channel estimation matrix requires complex matrix operations including matrix inversion of a matrix whose dimensions are the number of pilots, e.g., up to 21×21.

It is with respect to these and other considerations that the present improvements have been needed.

DETAILED DESCRIPTION

Various embodiments may be generally directed to systems that employ wireless communications using frequency division multiplexing. Some embodiments may be particularly directed to architecture and methods for channel estimation based upon transmitted pilots.

In various embodiments, a two-stage channel estimation technique and architecture may be applied to multiple input multiple output communications systems. In some embodiments, the communications systems may employ frequency division wireless communication, which may provide pilots distributed within a large number of closely spaced carriers that are each assigned to a respective set of channels. In accordance with various embodiments, an architecture and method are provided to process pilots and data tones from a resource such as a PRU or sub-frame, such that processing of data tones may be performed in logical order, e.g., the order in which the Quadrature amplitude modulation (QAM) symbols of a specific encoded data stream are mapped, while a portion of channel estimation is done in physical order. In some embodiments, both channel estimation and whitening may be performed in physical order.

Various embodiments may comprise one or more elements. An element may comprise any structure arranged to perform certain operations. Although an embodiment may be described with a limited number of elements in a certain arrangement by way of example, the embodiment may include more or less elements in alternate arrangement as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
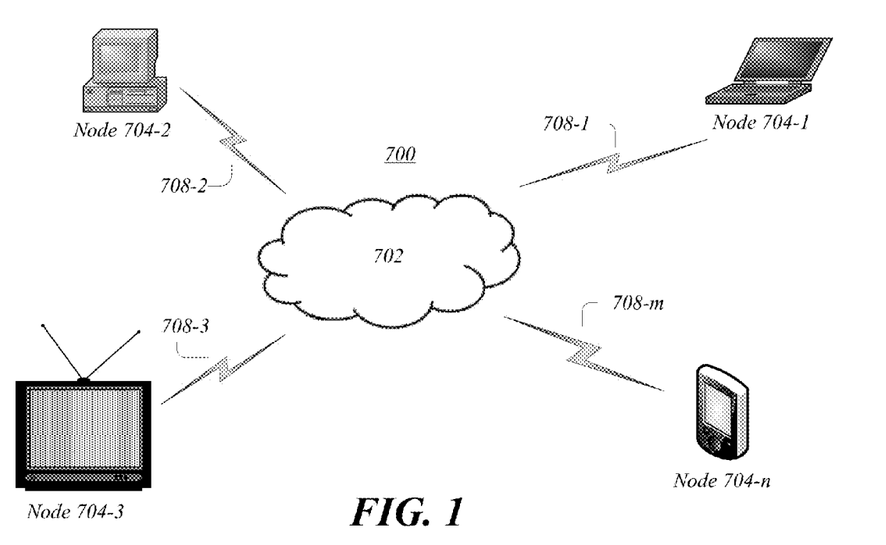
FIG. 1 illustrates one embodiment of a communications system.

FIG. 1 illustrates a block diagram of one embodiment of a communications system 700 that may include embodiments of the channel estimation architecture disclosed herein. As shown in FIG. 1, the communications system 700 may comprise a network 702 that communicates over links 708-$m$ with a plurality of nodes 704-$n$, where m and n may represent any positive integer value. In various embodiments, the nodes 704-$n$ may be implemented as various types of wireless devices. Examples of wireless devices may include, without limitation, a station, a subscriber station, a base station, a wireless access point (AP), a wireless client device, a wireless station (STA), a laptop computer, ultra-laptop computer, portable computer, personal computer (PC), notebook PC, handheld computer, personal digital assistant (PDA), cellular telephone, combination cellular telephone/PDA, smartphone, pager, messaging device, media player, digital music player, set-top box (STB), appliance, workstation, user terminal, mobile unit, consumer electronics, television, digital television, high-definition television, television receiver, high-definition television receiver, and so forth.

In some embodiments, a multiplicity of devices in communications system 700 may employ multiple input and multiple output (MIMO) communications in which both receiver and transmitter employ multiple antennae. Some embodiments of a communications system may be implemented with a radio technology such as IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. LTE-advance (LTE-A) is an evolution of the 3GPP LTE.

For clarity, the following description may focus on embodiments related to IEEE 802.16m. However, other embodiments may employ other standards, as noted above and/or generally known to those of skill in the art.

In various embodiments, an OFDM communications frame comprises multiple sub-frames. A subframe may include a plurality of physical resource units (PRUs) in the frequency domain. The PRU is a basic physical unit for resource allocation, and consists of a plurality of consecutive OFDM symbols in the time domain and a plurality of consecutive subcarriers in the frequency domain. The number of OFDM symbols included in the PRU may be equal to the number of OFDM symbols included in one subframe. Therefore, the number of OFDM symbols in the PRU can be determined according to a subframe type. For example, when one subframe consists of 6 OFDM symbols, the PRU may be defined by 18 subcarriers or a different number of sub-carriers, and 6 OFDM symbols.

A logical resource unit (LRU) is a basic logical unit for distributed resource allocation and contiguous resource allocation. The LRU is defined with a multiplicity of OFDM symbols and a multiplicity of subcarriers, and includes pilots used in the PRU. Therefore, a desired number of subcarriers for one LRU depends on the number of allocated pilots.

In the maplike structure of the 802.16m standard, maps and modulated data are interleaved into the same PRUs. The configuration of data bursts is not known until maps are demodulated, decoded and parsed. Therefore it may be more efficient to process the data tones in logical order, e.g. burst by burst or FEC by FEC. However, pilots-dependant algorithms. e.g., channel estimation and covariance estimation, are more suited for treatment in physical order, since pilots are sent per PRU. The present embodiments provide improvements in OFDM communications by providing novel and inventive arrangements for treatment of pilots and data by combining logical physical order treatment.

Figure 2:
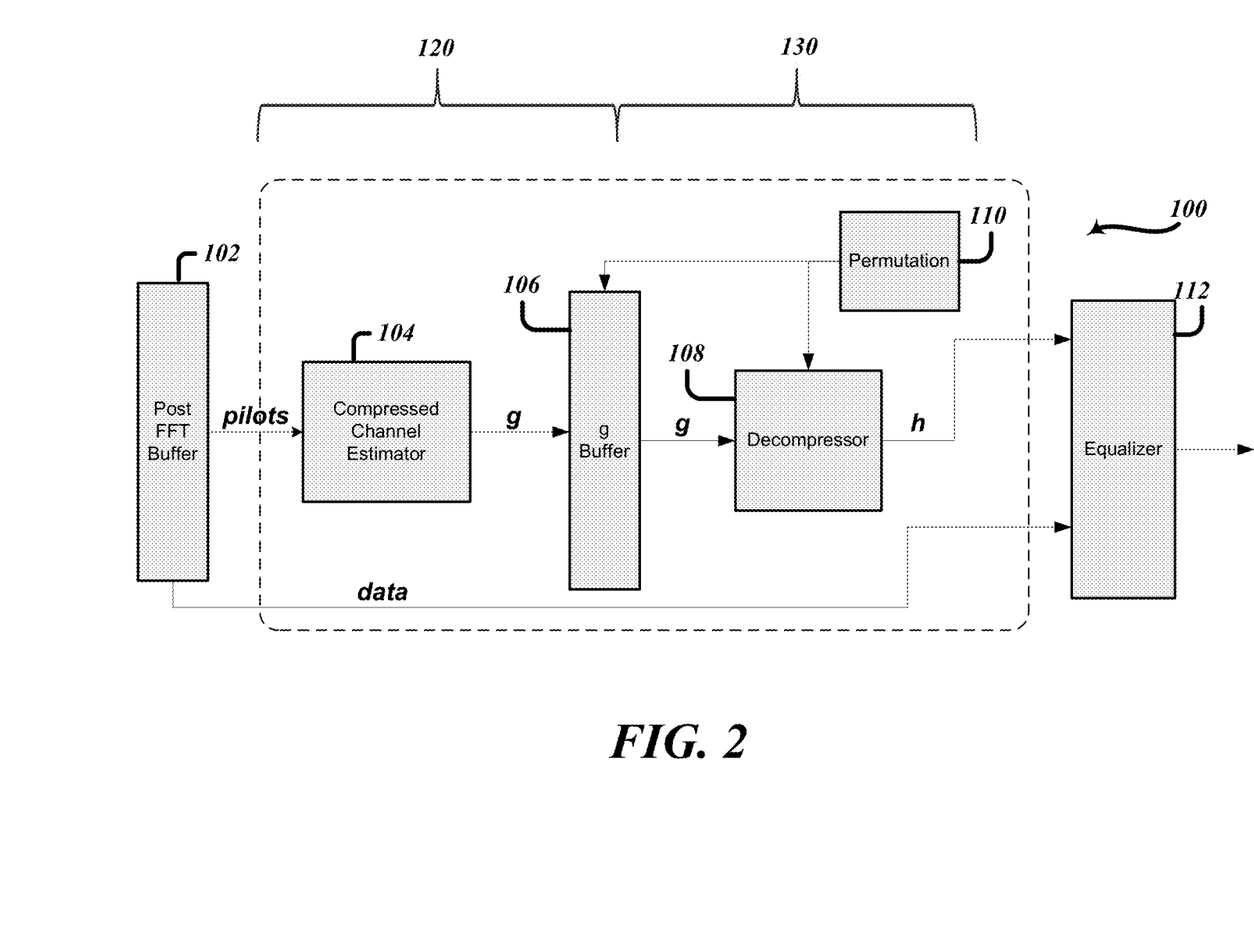
FIG. 2 illustrates one embodiment of a two-stage channel estimation architecture.

FIG. 2 illustrates a frequency domain architecture (also termed "arrangement") 100 according to one embodiment of a communications system receiver, which may employ OFDM communications. As illustrated, the arrangement includes a pilots processor section 120 and data tones processor section 130. The pilots processor section includes a channel estimator 104, which is arranged to receive information stored in a post-fast Fourier Transform (FFT) buffer 102. As described further below, channel estimator (also termed "compressed channel estimator") 104 may process pilots received from a PRU or set of PRUs stored in buffer 102 and determine a compressed channel estimate g for the OFDM channels. The compressed channel estimates may be output and stored in estimation buffer 106.

Arrangement 100 also includes a data tones processor section 130 arranged to process the data tones of a PRU separately from the processing of pilots of the PRU that takes place in channel estimator 104. In particular, the data tones may be processed at a different time than when the processing of the pilots from the same PRU takes place. In this manner, the pilot pattern and combination of various pilots need only be treated in the pilot processing section 120. The data tones processor 130 may include a permutation block 110 that is arranged to calculate the locations from which to read data tones from a given PRU that are stored in post FFT buffer 102. Decompressor 108 is arranged to receive the compressed channel estimates g stored in estimation buffer 106. As described further below, decompressor 106 may apply a fixed interpolation matrix to a multiplicity of compressed channel estimate vectors g to calculate and output a full channel estimate h of each data tone. In architecture 100, the decompressor is coupled to an equalizer 112 that may receive the channel estimate h as well as sample of the data tone for each tone. Equalizer 112 may then output the metrics, such as a log likelihood ratio for a data tone. Although not depicted in FIG. 2, in various embodiments, the channel estimates g, h, and data tones may be subject to whitening, as described further below. In various embodiments, components of data tone processor 130 may be embodied in a microprocessor or similar hardware. The decompressor 108 may be operable to apply a fixed interpolation matrix to a multiplicity of channel estimate vectors g received from estimation buffer 106.

One advantage provided by the present embodiments, such as that depicted in FIG. 2, is that a 2D LMMSE channel estimation can be performed in pilots processor 120 using pilots extracted from a PRU without the computational complexity or storage capacity that would be required using conventional channel estimation approaches. In some embodiments, compressor 104 may perform a compressed channel estimation using only about 10% of the amount of coefficient storage required in a known 2D LMMSE matrix approach. In addition, in some embodiments for channel estimation using common PRU sizes, the number of multiplication operations for estimating each channel of a PRU may be reduced by about 50%.

The present embodiments also provide greater flexibility by separating data tone processing from channel estimation. Because most calculations may be consumed in data tone processing, it may be convenient to segregate these calculations in dedicated processor hardware where the matrix operations for decompression may be fixed, or only occasionally altered. On the other hand, a reduced size matrix used to perform a compressed channel estimate in the pilot processor 104 may be continually updated according to the received measurements. In this manner, the "intelligent" operations are performed over a smaller dimension, facilitating calculation of compressed channel estimates in a DSP type processor.

In various embodiments, a two-stage channel estimation architecture may be especially advantageously applied for any communications systems in which modulated data is interspersed with maps. As previously noted, in 802.16m, maps and modulated data are interleaved into the same PRUs. The processing of data subcarriers in OFDM systems including 802.16m is by nature required to occur at a very high rate, although the configuration of data bursts is not determined until maps are demodulated, decoded and parsed. Therefore it is less efficient to process the data in physical order ("frequency first") and more efficient to process the data tones in logical order, e.g. in a burst-by-burst or FEC-by-FEC (forward error correction) manner. Thus, because the two-stage channel estimation architecture facilitates performing pilots-dependant processing physical order treatment of pilots-dependent processing, such as channel estimation and covariance estimation, and logical order processing of data tones, the data tones may be processed efficiently while also leading to reduced latency for processing maps and data bursts.

Figure 3:
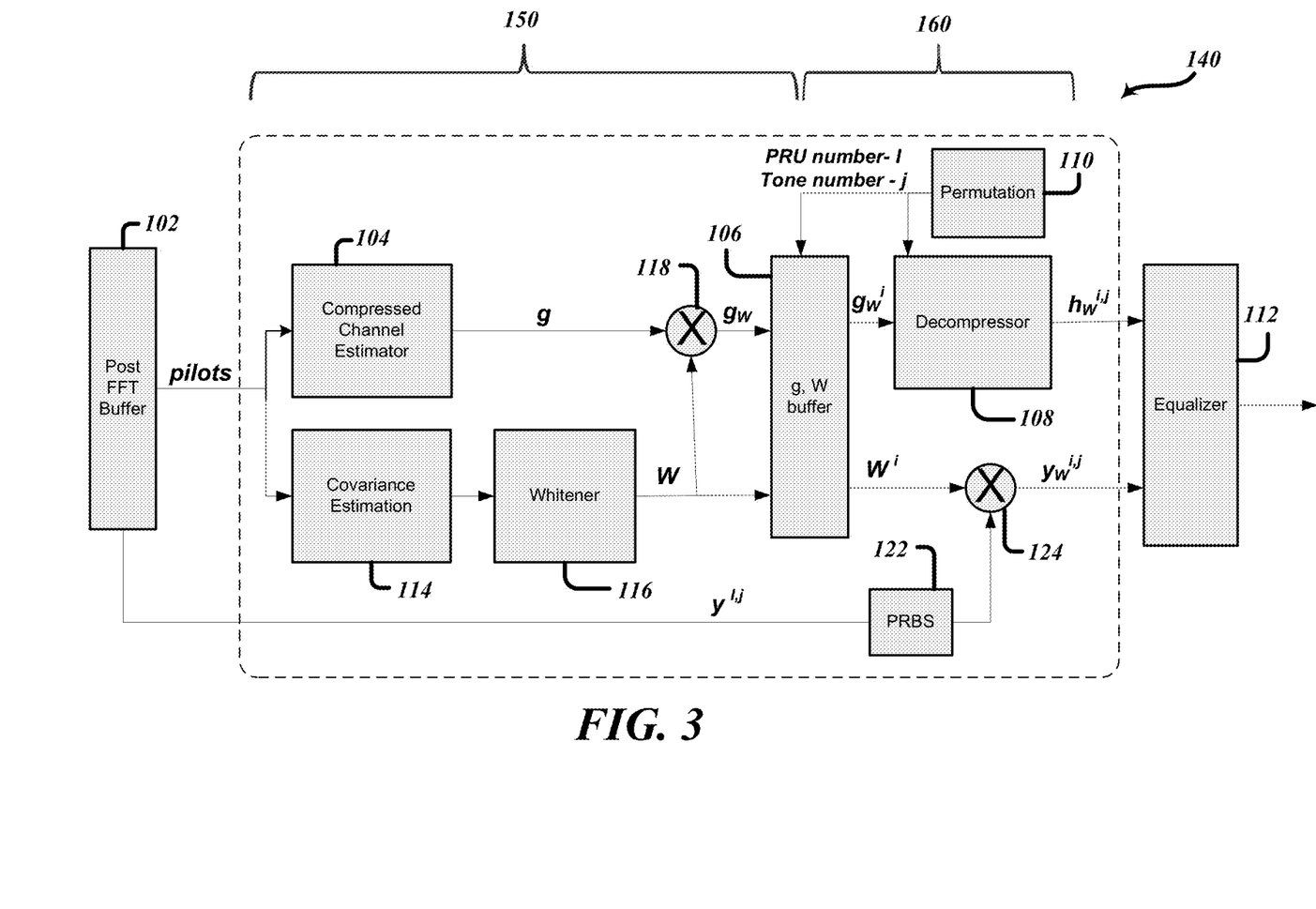
FIG. 3 illustrates another embodiment of a two-stage channel estimation architecture.

FIG. 3 depicts another embodiment of a frequency domain architecture 140, which may be arranged with similar elements as in arrangement 100, including compressor 104 and decompressor 108. In this embodiment elements to calculate a whitening matrix are provided within pilots processor 150. These elements may include a covariance estimator 114 and a whitening matrix calculator 116. The covariance estimator may be arranged to receive pilots from post-FFT buffer 102, to calculate a noise covariance matrix Rvv, and to output this matrix to whitening matrix calculator 116. In some embodiments, a whitening matrix W may be calculated as an inverse Choletsky decomposition of the received matrix. This whitening matrix may then be output by calculator 116 and used for various purposes, as described below.

As further depicted in FIG. 3, a multiplier 118 may be provided to receive the whitening matrix W and compressed channel estimate g and output the whitened channel estimate $g_w$ for storage in estimation buffer 106. This whitened channel estimate $g_w$ may be output and used for calculation of full whitened channel estimate $h_w$ by decompressor 108, similarly to the manner used by arrangement 100 described above for calculating h. For example, the whitened compressed channel estimate $g_w^i$ for PRU i may be sent to decompressor 108, which calculates a whitened full channel estimate $h_w^{i,j}$ for data tone j of the PRU.

In this embodiment, the data tones processor 160 also includes a multiplier 124 to receive whitening matrix W and the data tone samples $y^{i,j}$, which may be descrambled by PRBS block 122, and to output the whitened data tones $y_w^{i,j}$ to equalizer 112.

One advantage of architecture 140 is that whitening does not have to be performed separately for the channel coefficient of each data tone in the PRU. Since whitening typically entails performing multiple operations on the received pilots from a PRU, it may be inefficient to whiten the channel matrix of each data tone of a given PRU separately. In a conventional implementation, the channel and whitening would have to be estimated and stored in a buffer. The size of uncompressed channel estimates is much larger than the size of the received data since each tone of received data may be represented as $N_{RX} \times 1$, while each channel matrix may be represented as $N_{RX} \times N_{TX}$. Accordingly, the separate whitening of the channel matrix of each data tone would require a huge buffer in the absence of compression.

Figure 4:
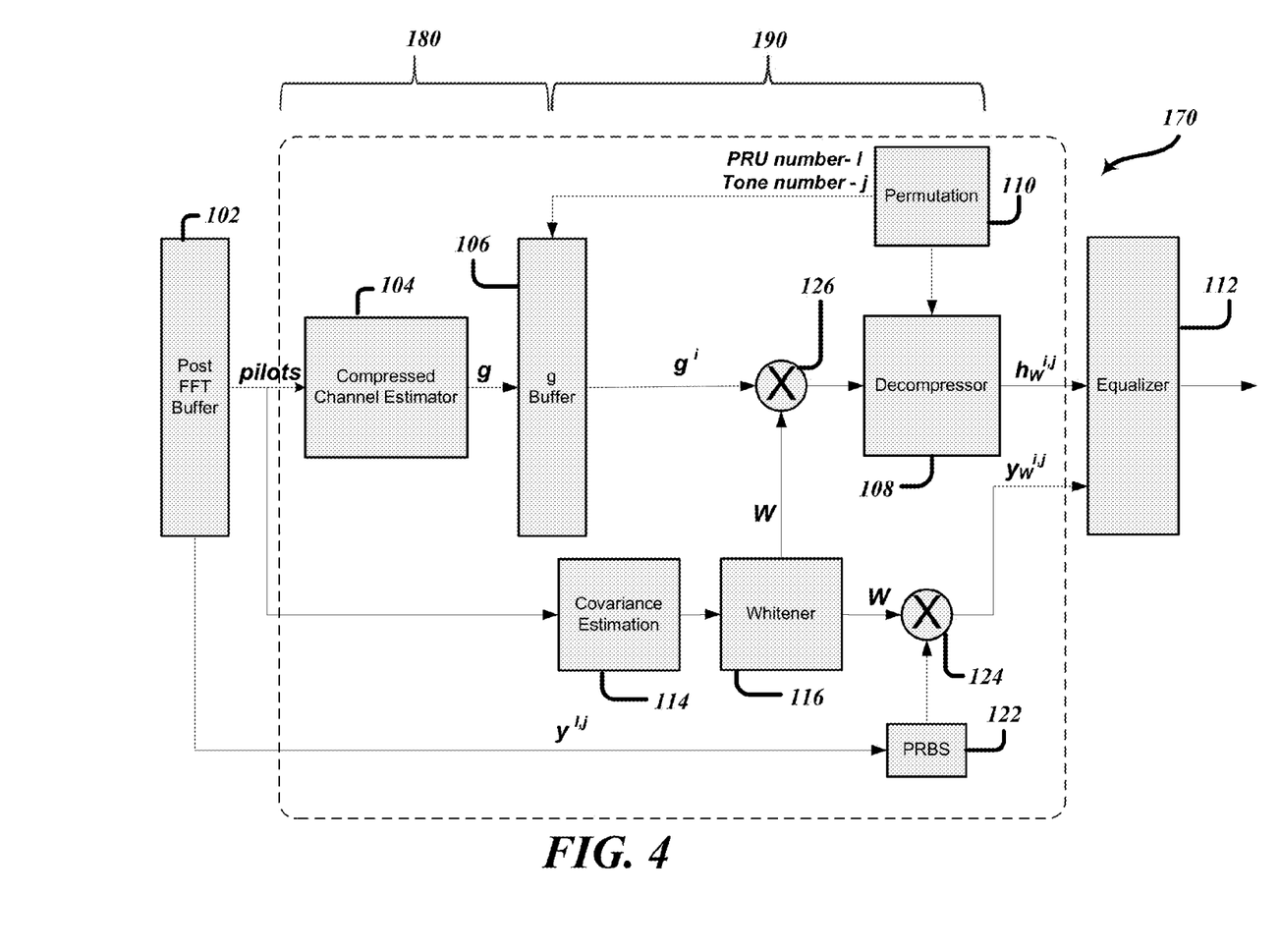
FIG. 4 illustrates another embodiment of a two-stage channel estimation architecture.

In some other embodiments, the channel whitening may be performed on a compressed channel estimation in the data tone processor, rather than in the pilots processor. FIG. 4 depicts such an arrangement 170 in which the covariance estimator 114 and a whitening matrix calculator 116 are arranged to output a whitened matrix W to a multiplier 126, which is arranged to receive a compressed channel estimate g from the estimation buffer 106. In this arrangement, channel whitening may be performed on units smaller than a PRU if desired.

In various embodiments, a set of hardware and/or software components may be arranged in a receiver to provide a two-stage channel estimation, in which pilots-based processing from a desired physical unit is performed to store a compressed channel estimation before data tones from the same unit are processed. According to some embodiments, the compressed channel estimation may be performed for each PRU or, alternatively, for each sub-frame. In some embodiments, the second stage of channel estimation (data tone processing) is triggered only when all relevant compressed channel estimates are calculated and ready to decode a specific burst of data. In some embodiments, a receiver that embodies a two-stage channel estimation architecture as disclosed, e.g., in the aforementioned figures, may simultaneously process pilots for compressed channel estimation from a first resource, such as a first PRU, and process data tones for decompression from a second resource, such as a second PRU. In this manner the processing of data bursts may be streamlined, since data tones from a first PRU of a sub-frame may be decompressed in a data tone processor in parallel to compression of pilots from a second PRU of the sub-frame. This may minimize the latency between processing of pilot patterns and/or data tones in successive PRUs.

In various embodiments, an LMMSE channel estimator may be embodied as a two-stage estimation process in which in a first stage the pilots processor calculates a channel estimate vector g based on a product of a received data signal y and a channel estimation matrix B. In a second stage, the full channel estimate may be calculated as a product of an interpolation matrix A and the channel estimation matrix taken over the pilots. In various embodiments of 2-stage channel estimation, the matrix A may be fixed such that it does not depend on the source of data, e.g., which pilots are used, but only on channel statistics. The matrix A may be constructed from the eigenvectors of the r-strongest eigenvalues of a channel covariance matrix. The estimated pilot-pilot and pilot-channel covariance matrices $R_{yy}$ and $R_{hy}$ and the matrix B may represent a projection of the LMMSE matrix of the relevant case on the matrix A, such that $B = A^* R_{hy} R_{yy}^{-1}$ The advantages of this approach over performing a conventional 2D LMMSE estimation of the channel may be appreciated by considering the following example. In general, channel estimation using pilots may be considered as a problem that entails estimating K parameters from N measurements. For example, suppose that three adjacent PRUs having a total of N=18 pilots are considered for estimating K=108 tones. In a conventional 2D LMMSE estimation with stored matrix, the number of multiplications involved in this calculation is NK, or 1944. However, it may be postulated that the true dimensionality d of the data is small compared to N and K. In this case, in order to simplify the channel estimation, the matrix may be broken down into matrices A*B, where A has dimension K×d and B has dimension d×N. The proper dimension d to represent the channel may be 8, for example, which may be based upon a chosen criterion. For example, the d value may be chosen as a value that produces a reasonable error floor, such as a level less than 40 dB. Using a value of 8 for d, the total number of multiplications is reduced to (108×8)+(8×18), or 1008. Thus, a 2-step channel estimation process using 18 pilots over three PRUs may reduce the number of multiplications from 1944 to 1008, or nearly 50%. More generally, in accordance with various embodiments, the number of multiplications may be reduced from NK to d(N+K), where d<<N,K.

In some embodiments, the compressed channel estimation described hereinabove may be used for time smoothing. In other words, g in [subframe n, PRU k] is a function of pilots in [subframe n, PRUs k−1, k and k+1] and g in [subframe n−1, PRU k]). This simplifies the dependencies to the pilots in the past subframe (s) to a single dependency on the compressed channel estimate. In other embodiments, the compressed channel estimation may be used for noise covariance estimation.

In some embodiments of a channel estimator, the channel estimation matrix B may be updated to adapt to changing channel statistics. The covariance matrices $R_{yy}$ and $R_{hy}$ may change over time, requiring periodic estimation of the covariance matrices, such as after each frame, in order to adapt the channel estimator. This may facilitate better performance when the delay spread or mobility are low, while also providing robustness for a large delay spread/mobility. The estimates of $R_{yy}$ and $R_{hy}$ may be noisy, making it desirable to average them over time. In some embodiments, an efficient way to calculate the LMMSE matrix $R_{hy}R_{yy}^{-1}$, while at the same time performing the required averaging may be provided by applying a least means square (LMS) adaptation of the LMMSE channel estimation. In particular, a steepest-descent gradient algorithm may be applied to obtain the following iteration:

$$B_{n+1}=B_n(I-\mu R_{yy})+R_{hy}^{-1} \quad (1)$$

where $\mu$ is the step size applied. It can be shown that if the matrices $R_{yy}$ and $R_{hy}$ are fixed, this iteration always converges to the correct solution $B=R_{hy}R_{yy}^{-1}$ for small enough value of $\mu$. In the LMS solution, these values may be replaced with their estimates to yield $$B_{n+1}=B_n(I-\mu \hat{R}_{yy}^n)+\mu \hat{R}_{hy}^n \quad (2)$$

When applied in conjunction with compressed channel estimates, using the decompression matrix A, the desired solution for B is $B=A^*R_{hy}R_{yy}^{-1}$, and may be obtained recursively by applying the following iteration instead of (2):

$$B_{n+1}=B_n(I-\mu \hat{R}_{yy}^n)+\mu A^* \hat{R}_{hy}^n$$

One advantage of performing this LMS adaptation is that no matrix inversion is required to perform the updates. This may avoid intensive calculations required to invert matrices in channel estimation for OFDM systems. For example, when considering three resource blocks in LTE, the matrix size is on the order of 24×24, leading to a non-trivial inversion. In various embodiments, the matrix update using LMS adaptation may be done after every new measurement. This contrasts to previous methods, where averaging is first performed, which may be followed by computation of the matrix, where the latter process is typically performed infrequently due to the complexity of the matrix inversion computation.

Figure 5:
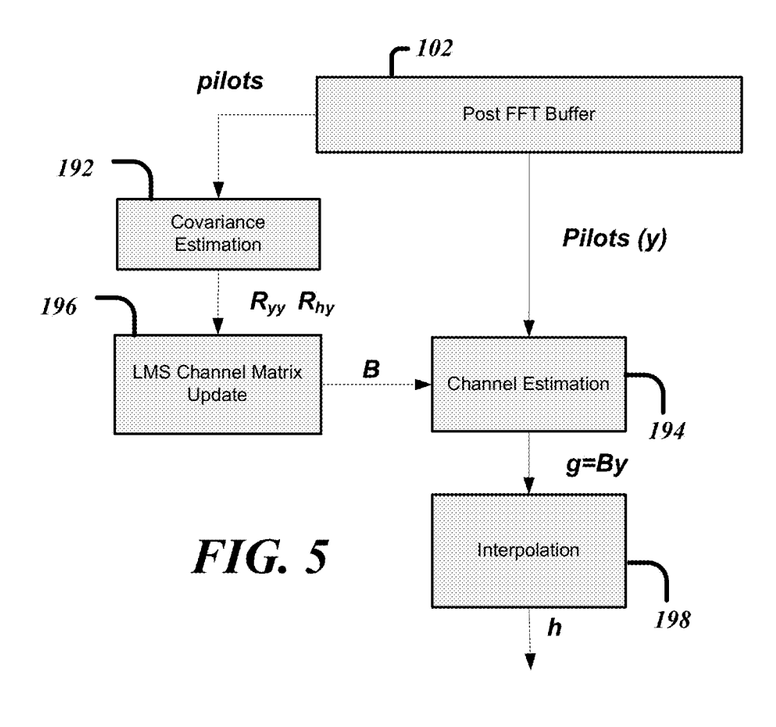
FIG. 5 illustrates a further embodiment of a channel estimation architecture that includes LMS adaptation.

FIG. 5 depicts one embodiment of an architecture for LMS adaptation of channel estimation. Pilots in a resource block may be retrieved from buffer 102 and forwarded to channel estimator 194, which in some embodiments may be arranged similarly to channel estimator 104. Thus, channel estimator may receive pilots from a PRU or set of PRUs and output a compressed channel estimate g for the OFDM channels. The pilots may also be received by a channel covariance matrix estimator 192 for calculating $R_{yy}$ and $R_{hy}$ and sending the output to LMS channel matrix update engine 196. The engine 196 receives the covariance matrices and may perform an LMS iteration to update the matrix B for each new measurement as described above, according to $B_{n+1}=B_n(I-\mu \hat{R}_{yy}^n)+\mu A^* \hat{R}_{hy}^n$. The updated B value may be forwarded to channel estimator 194, such that the current calculation of channel estimate g is based on the updated matrix B. In some embodiments, the compressed updated g may be forwarded to a decompressor 198 for calculation of a full estimation based on the LMS-updated B matrix. Although the LMS adaptation to LMMSE matrix estimation may be performed in conjunction with the 2-stage channel estimation embodiments set forth hereinabove, in other embodiments LMS adaptation may be used in conjunction with conventional channel estimation, such as 1-D LMMSE, known 2-D LMMSE processes. In this case the LMS equations are modified by substituting A=I (the identity matrix).

In summary, the present embodiments provide improvements for processing of frequency division communications, including OFDM based systems. The architecture of the present embodiments, by using the aforementioned techniques for reducing the computational complexity, enables a 2D LMMSE channel estimation and on-the-spot estimation of interference covariance matrix, as opposed to current technologies that employ 1D channel estimation and interference estimation based on past pilots. Accordingly, more sophisticated procedures that enable better system performance are possible.

In addition to providing more efficient processing for systems employing the 802.16m and LTE standards, the architecture of the present embodiments reduces latency and saves buffer space in OFDM systems in general, including, 802.16m, 802.16e and LTE-based systems.

In various embodiments, the channel estimation matrices may be updated according to changing channel statistics using an LMS approach without requiring matrix inversion.

Figure 6:
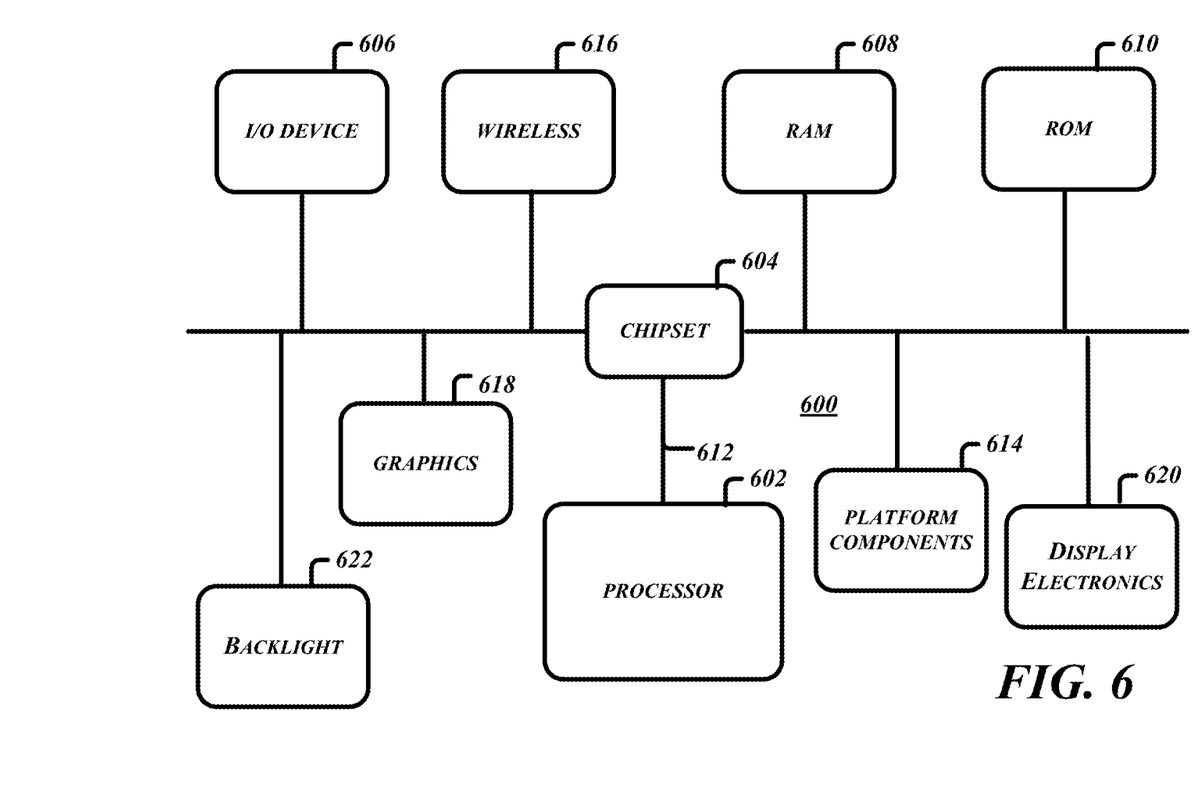
FIG. 6 is a diagram of an exemplary system embodiment.

FIG. 6 is a diagram of an exemplary system embodiment. In particular, FIG. 6 is a diagram showing a platform 600, which may include various elements. For instance, FIG. 6 shows that platform (system) 600 may include a processor 602, a chipset 604, an input/output (I/O) device 606, a random access memory (RAM) (such as dynamic RAM (DRAM)) 608, and a read only memory (ROM) 610, display electronics 620, display backlight 622, and various other platform components 614 (e.g., a fan, a crossflow blower, a heat sink, DTM system, cooling system, housing, vents, and so forth). System 600 may also include wireless communications chip 616 and graphics device 618. The embodiments, however, are not limited to these elements.

As shown in FIG. 6, I/O device 606, RAM 608, and ROM 610 are coupled to processor 602 by way of chipset 604. Chipset 604 may be coupled to processor 602 by a bus 612. Accordingly, bus 612 may include multiple lines.

Processor 602 may be a central processing unit comprising one or more processor cores and may include any number of processors having any number of processor cores. The processor 602 may include any type of processing unit, such as, for example, CPU, multi-processing unit, a reduced instruction set computer (RISC), a processor that have a pipeline, a complex instruction set computer (CISC), digital signal processor (DSP), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A receiver of a communications system, comprising:
a pilots processor arranged to determine compressed channel estimate vectors for a multiplicity of carriers using pilots received in a set of physical resource units (PRUs), the pilots processor comprising a compressed channel estimator operable to calculate a compressed channel estimate vector that is linearly dependent on the received pilots;
a whitener arranged to calculate a whitening matrix;
a channel whitening unit arranged to calculate a whitened compressed channel estimate vector from a matrix product of the whitening matrix and the compressed channel estimate vector; and
a de-compressor arranged to compute a channel estimate for a given data tone of the set of PRUs based upon the compressed channel estimate vectors;
wherein the receiver comprises part of a multiple carrier frequency wireless communication system.

2. The receiver of claim 1, comprising an estimation buffer operable to store the compressed channel estimates vectors at a first time for processing by the de-compressor at a second time.

3. The receiver of claim 1, the compressed channel estimator arranged to perform a linear minimum mean square error calculation based upon the received PRUs and a given linear de-compressor.

4. The receiver of claim 1, comprising a processor arranged to estimate a whitened channel by de-compressing the whitened compressed channel estimate vector.

5. The receiver of claim 1, the pilot processor comprising:
a channel covariance matrix estimator arranged to receive the pilots of the PRU and to output a pilot-pilot covariance matrix and pilot-channel covariance matrix; and
a channel matrix update engine arranged to perform a least mean squares adaptive update to the channel estimation matrix and to output the updated channel estimation matrix to the channel estimator.

6. The receiver of claim 1, the wireless communications system comprising a digital display.

7. The receiver of claim 1, the receiver comprising:
a programmable signal processing processor that includes the pilots processor; and
a data tones processor that includes the decompressor.

8. The receiver of claim 7, wherein the receiver is arranged to store in a buffer the compressed channel estimates for a set of PRUs before the de-compressor computes the channel estimates for the data tones of that set of PRUs.

9. The receiver of claim 7, comprising:
an estimation buffer operable to store the compressed channel vectors estimate received from the pilots processor, the whitener arranged to receive stored compressed channel estimates from the estimation buffer for whitening.

10. An apparatus, comprising a receiver of a multiple carrier frequency wireless communications system, comprising:
a channel estimator arranged to extract pilots from a received physical resource unit (PRU) and to calculate a compressed channel estimate vector as a product of an estimation matrix and the pilots;
an interpolator arranged to receive values of the compressed channel estimate vector and to apply an interpolation matrix to determine an interpolated channel estimation as a product of the interpolation matrix and the compressed channel estimate vector;
an estimation buffer arranged to store the compressed channel estimate vector at a first time;
a data tones processor arranged to receive the compressed channel estimate vector at a second time and to produce an interpolated channel estimate of each data tone of the PRU using the interpolation matrix and the compressed channel estimate vector;
a channel covariance matrix estimator arranged to receive the pilots and to output a pilot-pilot covariance matrix and pilot-channel covariance matrix; and a channel matrix update engine arranged to perform a least mean squares adaptive update to the channel estimation matrix and to output an updated channel estimation matrix to the channel estimator.

11. The apparatus of claim 10, the channel matrix update engine arranged to update a value of the estimation matrix based upon respective estimated pilot-pilot and pilot-channel covariance matrices $R_{yy}$ and $R_{hy}$ using a step size $\mu$; according to $B_{n+1}=B_n(I-\mu\hat{R}_{yy}{}'')+\mu A^*\hat{R}_{hy}{}''$.

12. The apparatus of claim 10, the channel estimator arranged to perform a linear minimum mean square error calculation based upon the received PRUs and a given linear de-compressor.

13. An article comprising a non-transitory computer-readable storage medium containing instructions that if executed by a processor enable a system to:
  determine compressed channel estimate vectors for each of a multiplicity of carriers using pilots received in a set of physical resource units (PRUs) that each comprise pilots and data tones;
  determine a noise covariance matrix based upon the received pilots;
  calculate a whitening matrix based upon the noise covariance matrix;
  store the compressed channel estimate vectors in an estimation buffer at a first time;
  store a product of a compressed channel estimate vector and the whitening matrix in the estimation buffer;
  calculate an interpolated channel estimate of each data tone based upon the stored product; and
  decompress the compressed channel estimate vectors in a data tones processor at a second time.

14. The article of claim 13, comprising instructions that if executed by a processor enable the system to determine a compressed channel estimate vector as a product of a pilot and a channel estimation matrix corresponding to the pilot.

15. The article of claim 14, comprising instructions that if executed by a processor enable the system to:
  calculate a pilot-pilot covariance matrix $R_{yy}$ and pilot-channel covariance matrix $R_{hy}$ based upon the received pilots of the PRUs;
  perform a least mean squares adaptive update to a channel estimation matrix $B_n$; and
  calculate an updated compressed channel estimate vector g based upon the updated channel estimation matrix $B_{n+1}$.

16. The article of claim 15, wherein, using a step size $\mu$, $B_{n+1}=B_n(I-\mu\hat{R}_{yy}{}'')+\mu A^*\hat{R}_{hy}{}''$.

17. A method, comprising:
  determining, using pilots received in a set of physical resource units (PRUs) that comprise a multiplicity of data tones and pilots, a compressed channel estimate vector for each of a multiplicity of carriers in an orthogonal frequency division multiplexing communications system, wherein each compressed channel estimate vector is determined as a product of a pilot and a channel estimation matrix corresponding to the pilot;
  storing at least each compressed channel estimate vector in an estimation buffer at a first time;
  decompressing, at a second time, each compressed channel estimate vector using an interpolation matrix to produce an interpolated channel estimate for each data tone;
  whitening the interpolated channel estimate H and a sample for each data tone; and
  calculating a log likelihood ratio for each data tone based upon the whitened channel estimate and whitened data tone.

18. The method of claim 17, comprising:
  determining a pilot-pilot covariance matrix $R_{yy}$ and pilot-channel covariance matrix $R_{hy}$;
  updating a value of a channel estimation matrix $B_n$ based upon respective estimated pilot-pilot and pilot-channel covariance matrices $\hat{R}_{yy}$ and $\hat{R}_{hy}$ using a step size $\mu$; according to $B_{n+1}=B_n(I-\mu R_{yy}{}'')+\mu A^*R_{hy}{}''$; and
  calculating an updated compressed channel estimate vector based upon the updated value of the channel estimation matrix $B_n$.

* * * * *